United States Patent

[11] 3,581,838

| [72] | Inventor | Harry W. Rhodes<br>Belton, Mo. |
|---|---|---|
| [21] | Appl. No. | 791,311 |
| [22] | Filed | Jan. 15, 1969 |
| [45] | Patented | June 1, 1971 |
| [73] | Assignee | Norton Company<br>Worcester, Mass. |

[54] VEHICLE GUIDING APPARATUS
13 Claims, 5 Drawing Figs.

[52] U.S. Cl. ................................................. 180/79,
104/244.1
[51] Int. Cl. ................................................. B62d 1/26
[50] Field of Search ........................................ 180/79;
299/(Inquired)104/244.1; 172/26

[56] References Cited
UNITED STATES PATENTS
1,980,553  11/1934  Salisbury ....................... 180/79UX

| 3,397,651 | 8/1968 | Biedess ........................ | 104/244.1 |
| 3,402,784 | 9/1968 | Roberson ..................... | 180/79 |

FOREIGN PATENTS
| 832,741 | 4/1960 | Great Britain ............... | 104/244.1 |
| 832,745 | 4/1960 | Great Britain ............... | 104/244.1 |

Primary Examiner—Kenneth H. Betts
Assistant Examiner—John A. Pekar
Attorney—Schmidt, Johnson, Hovey, Williams & Chase

ABSTRACT: Automatic guiding apparatus for a groove-cutting machine has a sensing unit on a forwardly extending arm which is swingable vertically to not only remove the feelers of the sensing unit from the grooves, but to disengage certain parts of the apparatus from the steering mechanism. Automatic steering takes place upon relative movement vertically and laterally of two components of the sensing unit.

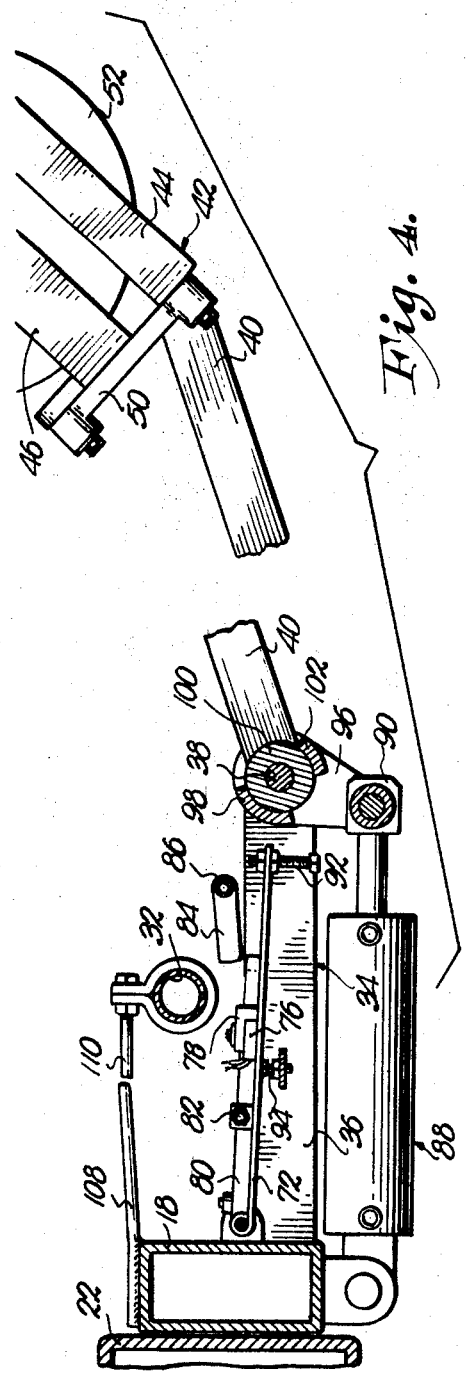
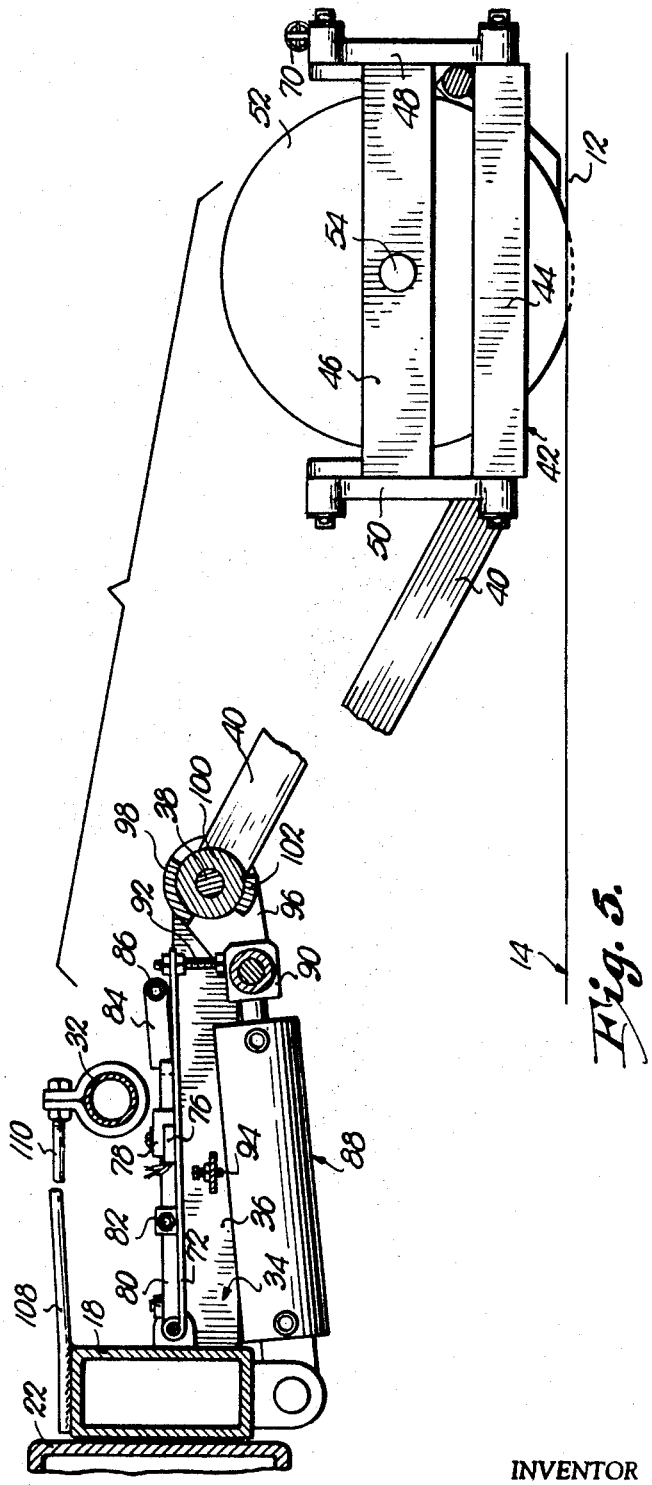
INVENTOR
Harry W. Rhodes

3,581,838

VEHICLE GUIDING APPARATUS

An important object of my present invention is to provide a groove-sensing unit for an automatic steering assembly that initiates steering in the proper direction upon relative movement of a pair of frames coupled by parallel linkage, one frame moving laterally with the machine and the other moving laterally in accordance with the course of the grooves.

Another important object of the instant invention is the provision of novel means for preventing oversteering.

A further object of the present invention is to provide for simple connect-disconnect means as the machine is converted from manual to automatic steering and vice versa.

In the drawings:

FIG. 4 is a fragmentary, cross-sectional view taken on line 4—4 of FIG. 3; and

FIG. 5 is a view similar to FIG. 4 showing the sensing unit in its operative lowered position.

Figure 1:
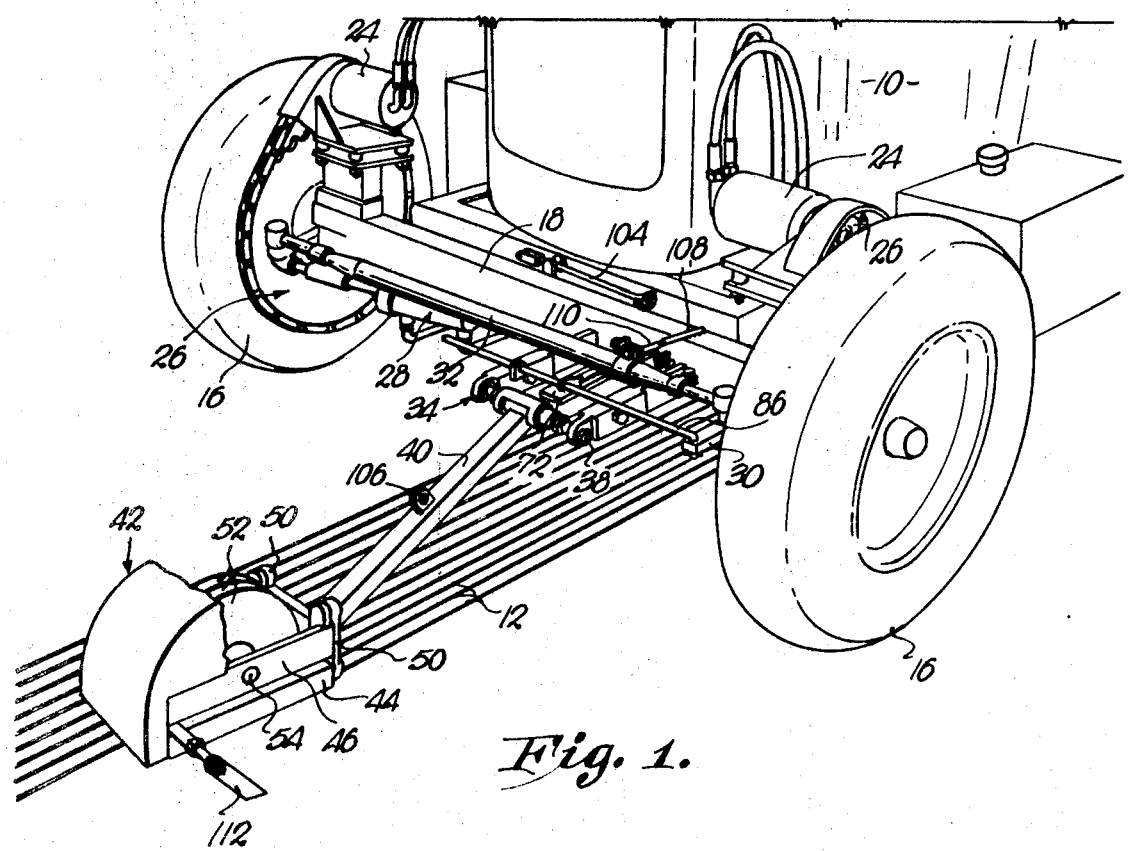
FIG. 1 is a perspective view showing the forwardmost end of a vehicle and illustrating the guiding apparatus for such vehicle made in accordance with my present invention.
Figure 2:
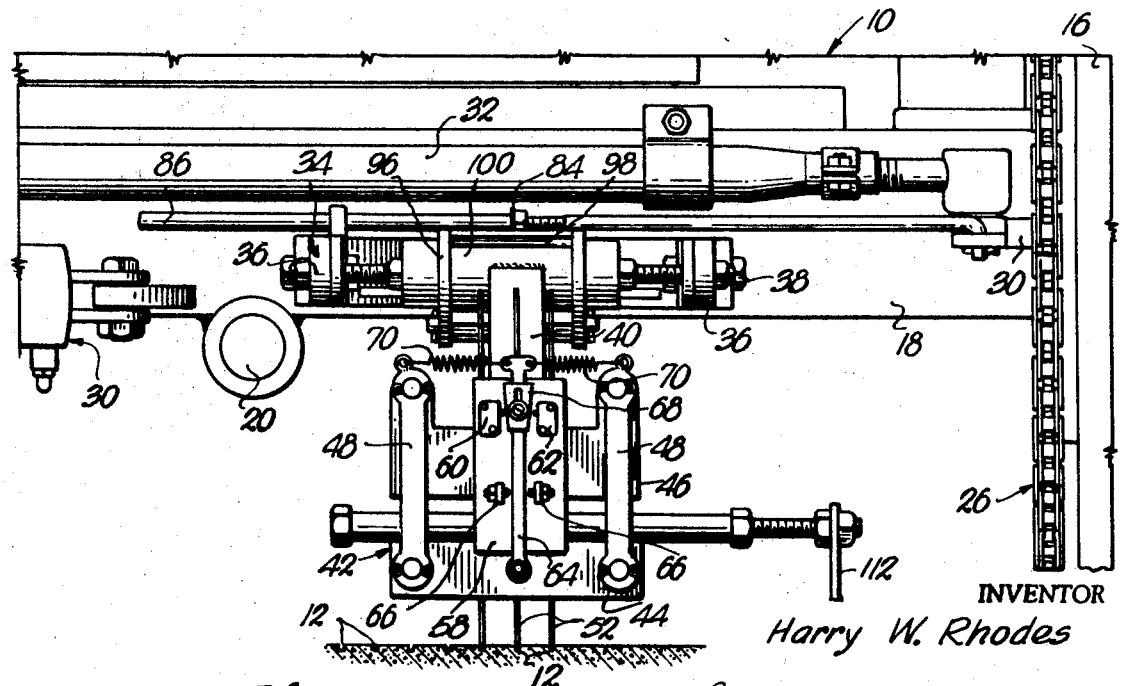
FIG. 2 is a fragmentary front elevational view of the vehicle and the guiding apparatus illustrated in FIG. 1.
Figure 3:
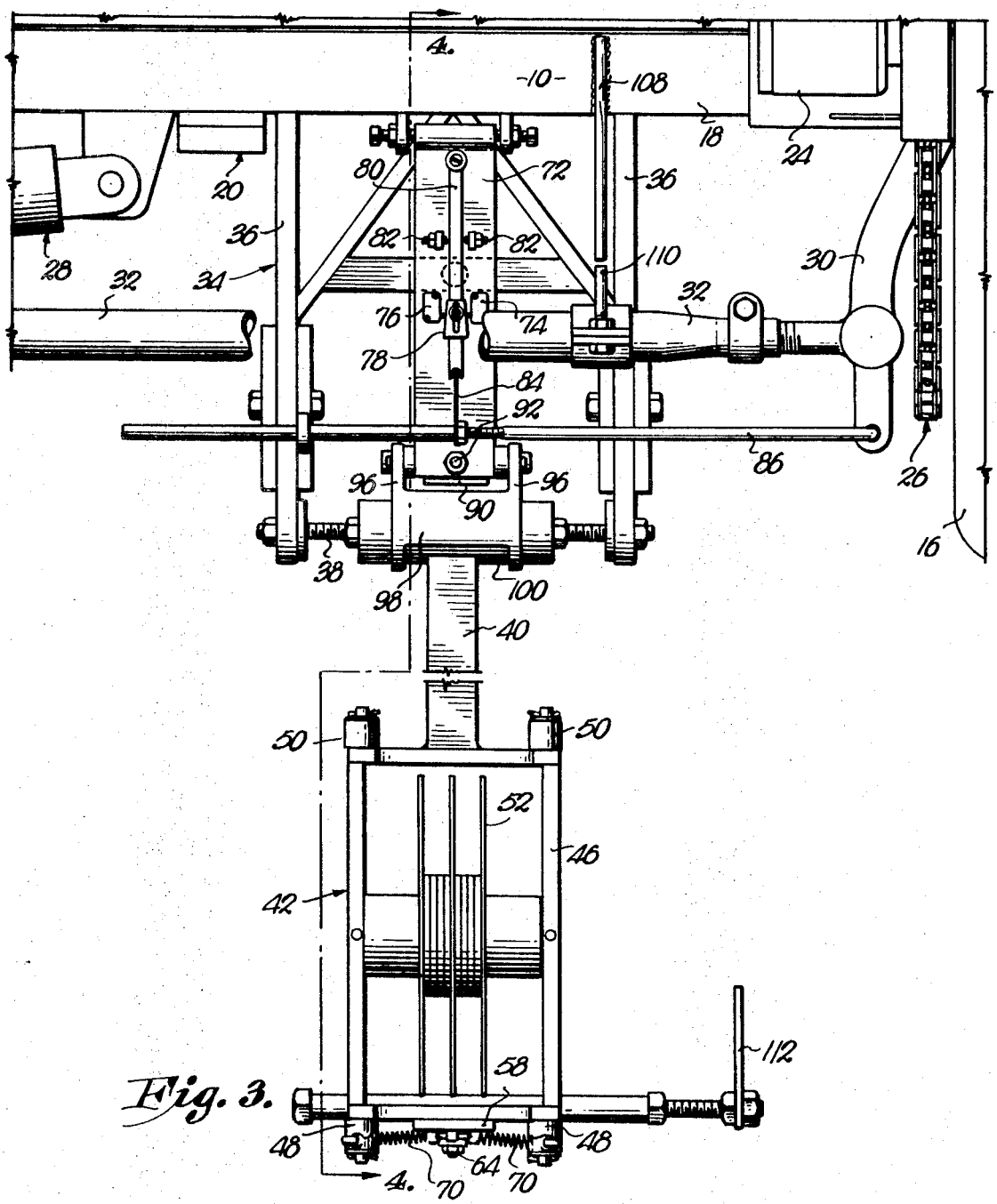
FIG. 3 is an enlarged, fragmentary plan view of the vehicle and the guiding apparatus shown in FIGS. 1 and 2.

The vehicular groove-cutting machine 10 shown fragmentarily in the drawings is generally in the nature of the machine of my U.S. Pat. No. 3,333,897, issued Aug. 1, 1967, except that the machine 10 has a bank of disc cutters (not shown) for cutting a series of spaced parallel grooves 12 in surface 14 of a runway, road or other pavement during each pass of the machine 10.

The machine 10 has a pair of steerable wheels 16 separately coupled with an axle 18 which is, in turn, swingable about a fore-and-aft, horizontal pivot 20 that attaches the axle 18 to a chassis beam 22 of the machine 10. The wheels 16 are driven by a pair of fluid motors 24 through corresponding sprocket and chain assemblies 26 and are steered by a fluid piston and cylinder unit 28. Steering links 30 of the wheels 16 are joined by a cross link 32, and the unit 28 pivotally interconnects the axle 18 with one of the links 30.

In accordance with my instant invention, a support 34 welded directly to the axle 18 has a pair of forwardly extending bars 36 receiving a pivot 38 for a vertically swingable, laterally adjustable arm 40. A sensing unit 42 has a lower frame 44 rigid to the arm 40 and an upper frame 46 coupled with the frame 44 by a pair of front parallel links 48 and a pair of rear parallel links 50.

A number of feeler discs 52 adapted to ride in the grooves 12 rotate freely within the frames 44 and 46 about a shaft 54 traversing the frame 46.

A plate 58 on the frame 44 supports a pair of normally open electric switches 60 and 62 between which is an operating lever 64 pivotally secured to the frame 44. Adjustable stops 66 on the plate 58 limit the extent of swinging movement of the lever 64, and a switch-actuating head 68 is vertically adjustable on the lever 64. Centering springs 70 for the lever 64 connect the latter with the frame 46.

Another plate 72 swingable and laterally adjustable on the axle 18 has a second pair of normally closed switches 74 and 76 actuated by a head 78 adjustable along a lever 80 that is swingable on the plate 72 between adjustable stops 82. The free end of the lever 80 receives a leaf spring 84 that is adjustable on a rod 86 reciprocably carried by the support 34 and pivotally connected with one of the links 30.

A fluid piston and cylinder assembly 88 pivotally connected with the axle 18 has a head 90 which engages an adjustable bolt 92 depending from the plate 72 to raise the latter, the extent of downward movement of the plate 72 being determined by an adjustable stop 94 on the support 34.

The head 90 is pivotally connected to a pair of ears 96 which are rigid to a split tube 98. The tube 98 is rotatable on a hub 100 that is in turn rigid to the arm 40 and rotatable on the pivot 38. A segment 102 of the tube 98 is rotatable into and out of engagement with the arm 40 during actuation of the assembly 88. A clevis rod 104 on the beam 22 connects with an ear 106 on the arm 40 to hold the unit 42 elevated during nonuse. Pointers 108 and 110 on the beam 22 and on the link 32 respectively and a pointer 112 on the frame 44 are visible by the operator on the machine 10.

In operation, during the first pass of the machine 10 along an airport runway, for example, the unit 42 is held elevated by the rod 104 while the first set of grooves 12 is formed. Thereafter, during successive groove-cutting operations, the unit 42 is lowered so that the discs 52 follow in the previously cut grooves 12. During turnaround at the end of each pass the operator of the machine 10 causes actuation of the assembly to raise the unit 42 and thereby withdraw the discs 52 from the grooves 12. Extension of the piston rod of the assembly 88 from the position shown in FIG. 5 swings the head 90 and the ears 96 downwardly and forwardly to in turn rotate the tube 98 anticlockwise, viewing FIGS. 4 and 5. This causes the segment 102 to engage the arm 40 and swing it upwardly to the position shown in FIG. 4.

At the same time, withdrawal of the head 90 from the bolt 92 lowers the plate 72 until it comes to rest on the stop 94. This withdraws the bifurcated, free end of the lever 80 from the spring 84 and permits manual steering of the machine 10 until the turn is made and the unit 42 again lined up with the grooves 12 just previously cut. The operator is aided in such alignment by the pointer 112, and he also utilizes the pointers 108 and 110 to align the spring 84 with the lever 80. Manual steering of the wheels 16 shifts the link 32 until the pointer 110 is aligned with the pointer 108, whereupon the head 90 is retracted to lower the arm 40 and raise the plate 72 until the lever 80 is again interlocked with the spring 84.

As long as the machine 10 properly follows the course of the grooves 12, the lever 64 is held centered between the switches 60 and 62 by the springs 70. If, however, the machine 10 deviates angularly from such course, it causes the arm 40 to swing laterally of the grooves 12 and similar lateral movement is imparted through the arm 40 to the frame 44. The plate 58 is thus shifted relative to the frame 46 to move one of the switches 60 or 62 into engagement with the head 68 to close corresponding electrical circuits. Conversely, if the course of the grooves 12 changes, the frame 46 shifts laterally relative to the frame 44, swinging the head 68 through one of the springs 70 to close one of the switches 60 or 62. During lateral movement of frame 44 the frame 46 is restrained against such movement therewith by the discs 52 riding in the grooves 12. During lateral movement of the frame 46 the frame 44 is restrained against such movement therewith by the machine 10 holding the arm 40 and the frame 44 against lateral movement. While the extent of relative movement of the head 68 and the switches 60 and 62 is limited by the stops 66, the frames 44 and 46 may continue to shift laterally with respect to each other by virtue of the yieldability of the springs 70.

Closing of the switch 60 closes a circuit through the switch 74 to in turn energize a solenoid valve which causes flow of fluid to the assembly 28 on one side of its piston, thereby automatically steering the machine 10 in one direction. Such steering of the machine 10 continues until the link 32, and therefore the rod 86, shift far enough to swing the lever 80, through the spring 84, to a position opening the switch 74, thereby breaking the circuit with which switches 60 and 74 are coupled in series. The solenoid valve that is controlled by such circuit is deenergized and the flow of fluid to the assembly 28 ceases, thereby preventing oversteering. While stops 82 limit the extent of movement of lever 80, and therefore the head 78, the spring 84 permits continued movement of the rod 86 until such time as the assembly 28 is fully deactivated.

Conversely, closing of the switch 62 closes a second circuit through the switch 76 to in turn energize a second solenoid valve which causes flow of fluid to the assembly 28 on the opposite side of its piston, thereby automatically steering the machine 10 in the opposite direction. Here again, such steering of the machine 10 continues until the link 32, and therefore the rod 86, shift far enough to swing the lever 80, through the spring 84, to a position opening the switch 76, thereby breaking the second circuit with which switches 62 and 76 are coupled in series. The second solenoid valve is deenergized and the flow of fluid to the assembly 28 ceases, thereby preventing oversteering in such opposite direction.

The electric circuits above mentioned with the coils of the solenoid-controlled valves and the switches 60, 62, 74 and 76 therein, together with the hydraulic circuit with the assembly 28 and the aforementioned valves therein may be quite conventional and have not, therefore, been illustrated.

Having thus described the invention, what I claim as new and desire to be secured by Letters Patent is:

1. In apparatus for automatically actuating steering mechanism of a groove-cutting machine to guide the latter along a course defined by a groove previously cut thereby, a sensing unit including:
   a pair of frame members;
   feeler means mounted on one of said members and adapted to ride in said groove during advancement of the machine along the groove;
   a coupling rigidly secured to the other of said members and adapted for attachment to said machine;
   said coupling extending forwardly of the machine when attached thereto for swinging movement of said other member laterally of said course in response to angular deviation of the machine from said course during said advancement of the machine;
   structure pivotally interconnecting the members for movement of said one member laterally and vertically relative to said other member in response to said lateral movement of the other member;
   switch means for controlling said mechanism; and
   switch operating means responsive to said relative movement of the members;
   said structure including linkage for maintaining said members parallel;
   said linkage having pivotal connections with each of said members;
   said connections extending fore and aft of the members;
   said feeler means including a disc rotatable about an axis traversing the path of travel of the machine;
   said connections being normal to said axis in alignment with said path.

2. The invention of claim 1,
   said linkage including a pair of front parallel links and a pair of rear parallel links.

3. In apparatus for automatically actuating steering mechanism of a groove-cutting machine to guide the latter along a course defined by a groove previously cut thereby, a sensing unit including:
   a pair of frame members;
   feeler means mounted on one of said members and adapted to ride in said groove during advancement of the machine along the groove;
   a coupling rigidly secured to the other of said members and adapted for attachment to said machine,
   said coupling extending forwardly of the machine when attached thereto for swinging movement of said other member laterally of said course in response to angular deviation of the machine from said course during said advancement of the machine;
   structure pivotally interconnecting the members for movement of said one member laterally and vertically relative to said other member in response to said lateral movement of the other member;
   switch means for controlling said mechanism; and
   switch operating means responsive to said relative movement of the members,
   said switch means being mounted on said other member,
   said operating means interconnecting the members and being disposed to actuate the switch means upon predetermined lateral movement of the members laterally.

4. The invention of claim 3;
   stop means carried by said other member for limiting the extent of movement of said operating means relative to said other member; and
   connector means between said operating means and said one member,
   said connector means yielding to continued lateral movement of the members relatively after said operating means engages the stop means.

5. In apparatus for automatically actuating steering mechanism of a vehicle to guide the latter along a course defined by a groove, said apparatus including:
   a support adapted for attachment to the vehicle;
   a first frame member;
   feeler means mounted on said member and adapted to follow in said groove during advancement of the vehicle;
   a second frame member coupled with said support for swinging movement laterally of said course in response to angular deviation of the vehicle from said course during said advancement;
   structure pivotally interconnecting the members for relative lateral movement;
   first switch means carried by the second member for controlling said mechanism;
   a first operating means for said switch means responsive to said relative movement of the members;
   second switch means carried by said support for preventing oversteering;
   a second operating means for said second switch means adapted for connection with and responsive to actuation of aid mechanism,
   an element for controlling said second operating means,
   said element being carried by the support and adapted for connection with and responsive to actuation of said mechanism;
   releasable means coupling said element with said second operating means;
   power means for raising said feeler out of said groove; and
   means for releasing the connection of said operating means with said mechanism as the feeler is raised by said power means.

6. In apparatus for automatically actuating steering mechanism of a vehicle to guide the latter along a course defined by a groove, said apparatus including:
   a support adapted for attachment to the vehicle;
   a first frame member;
   feeler means mounted on said member and adapted to follow in said groove during advancement of the vehicle;
   a second frame member coupled with said support for swinging movement laterally of said course in response to angular deviation of the vehicle from said course during said advancement;
   structure pivotally interconnecting the members for relative lateral movement;
   first switch means carried by the second member for controlling said mechanism;
   a first operating means for said switch means responsive to said relative movement of the members;
   second switch means carried by said support for preventing oversteering;
   a second operating means for said second switch means adapted for connection with and responsive to actuation of said mechanism;
   power means for raising said feeler out of said groove; and
   means for releasing the connection of said operating means with said mechanism as the feeler is raised by said power means.

7. The invention of claim 6,
   a carrier for said second switch means and said second operating means; and
   means for shiftably connecting said carrier with said machine,
   said power means shifting the carrier during raising of said feeler.

8. In apparatus for automatically actuating steering mechanism of a vehicle to guide the latter along a course defined by a groove, said apparatus including:
- a support adapted for attachment to the vehicle;
- a first frame member;
- feeler means mounted on said member and adapted to follow in said groove during advancement of the vehicle;
- a second frame member coupled with said support for swinging movement laterally of said course in response to angular deviation of the vehicle from said course during said advancement;
- structure pivotally interconnecting the members for relative lateral movement;
- first switch means carried by the second member for controlling said mechanism;
- a first operating means for said switch means responsive to said relative movement of the members;
- second switch means carried by said support for preventing oversteering;
- a second operating means for said second switch means adapted for connection with and responsive to actuation of said mechanism;
- said second frame member being swingable vertically with respect to said support;
- power means for raising said second member; and
- a lost motion connection between said power means and said second member.

9. In apparatus for automatically actuating steering mechanism of a vehicle to guide the latter along a course defined by a groove, said apparatus including:
- a support adapted for attachment to the vehicle;
- a pair of relatively shiftable members;
- feeler means mounted on one of said members and adapted to follow in said groove during advancement of the vehicle,
- the other of said members being coupled with said support for swinging movement laterally of said course in response to angular deviation of the vehicle from said course during said advancement;
- first switch means carried by said other member for actuating said mechanism;
- a first operating means for said switch means responsive to relative lateral movement of the members;
- second switch means carried by said support for limiting the period of actuation of said mechanism by said first switch means to thereby prevent oversteering; and
- a second operating means for said second switch means adapted for connection with and responsive to actuation of said mechanism.

10. The invention of claim 9;
- power means for raising said feeler out of said groove; and
- means for releasing the connection of said operating means with said mechanism as the feeler is raised by said power means.

11. The invention of claim 10; and
- an element for controlling said second operating means,
- said element being carried by the support and adapted for connection with and responsive to actuation of said mechanism.

12. The invention of claim 10;
- a carrier for said second switch means and said second operating means; and
- means for shiftably connecting said carrier with said machine,
- said power means shifting the carrier during raising of said feeler.

13. In apparatus for automatically actuating steering mechanism of a vehicle to guide the latter along a course defined by a groove, said apparatus including:
- a support adapted for attachment to the vehicle;
- a forwardly extending arm coupled with the support for vertical swinging movement and held against lateral swinging movement relative to the support;
- feeler means for following in said groove;
- structure mounting said feeler means at the forward end of said arm for lateral shifting movement of the feeler means as a unit relative to said arm in response to angular deviation of the vehicle from said course during advancement of the vehicle therealong,
- said structure including means for holding said feeler means against swinging movement about a vertical axis relative to said arm such that the feeler means is relatively displaced to one side of the arm during said angular deviation of the vehicle;
- switch means at said forward end of the arm for controlling said mechanism; and
- operating means for said switch means at said forward end of the arm responsive to said relative displacement of the feeler means laterally of said arm.